United States Patent [19]
Grace

[11] Patent Number: 5,920,281
[45] Date of Patent: Jul. 6, 1999

[54] RADAR TEST SYSTEM FOR COLLISION AVOIDANCE AUTOMOTIVE RADAR

[75] Inventor: Martin I. Grace, San Jose, Calif.

[73] Assignee: Wiltron Company, Morgan Hill, Calif.

[21] Appl. No.: 08/946,143

[22] Filed: Oct. 7, 1997

Related U.S. Application Data

[60] Provisional application No. 60/054,759, Aug. 5, 1997.

[51] Int. Cl.⁶ .................................................. G01S 7/40
[52] U.S. Cl. ......................................... 342/165; 342/172
[58] Field of Search ..................................... 342/165, 172

[56] References Cited

U.S. PATENT DOCUMENTS

| | | | |
|---|---|---|---|
| 3,723,870 | 3/1973 | Donahue | 324/76.54 |
| 3,745,579 | 7/1973 | Lott | 343/17.7 |
| 3,831,088 | 8/1974 | Ort et al. | 324/76.29 |
| 3,832,712 | 8/1974 | Goetz et al. | 343/17.7 |
| 3,860,925 | 1/1975 | Darboven, Jr. | 343/9 |
| 3,924,341 | 12/1975 | Edelsohn | 35/10.4 |
| 4,209,786 | 6/1980 | Barley et al. | 343/17.7 |
| 4,435,712 | 3/1984 | Kipp | 343/17.7 |
| 4,477,811 | 10/1984 | Collins, IV | 343/17.7 |
| 4,660,045 | 4/1987 | Maples et al. | 342/170 |
| 4,679,049 | 7/1987 | Riffiod | 342/172 |
| 4,686,534 | 8/1987 | Eddy | 342/165 |
| 4,970,519 | 11/1990 | Minnis et al. | 342/165 |
| 4,972,192 | 11/1990 | Bruder | 342/6 |
| 5,111,208 | 5/1992 | Lopez | 342/174 |
| 5,138,325 | 8/1992 | Koury | 342/169 |
| 5,164,734 | 11/1992 | Fredericks et al. | 342/172 |
| 5,181,036 | 1/1993 | Miller et al. | 342/15 |
| 5,223,840 | 6/1993 | Cronyn | 342/170 |
| 5,351,054 | 9/1994 | Fredericks et al. | 342/172 |
| 5,384,572 | 1/1995 | Michaels et al. | 342/169 |
| 5,546,090 | 8/1996 | Roy, III et al. | 342/174 |
| 5,677,696 | 10/1997 | Silverstein et al. | 342/360 |

Primary Examiner—John B. Sotomayor
Attorney, Agent, or Firm—Fliesler, Dubb, Meyer & Lovejoy

[57] ABSTRACT

A radar test system for testing a collision avoidance radar system. The radar test system includes circuitry to down-convert a signal from the collision avoidance radar to an intermediate frequency signal, to delay the intermediate frequency signal to simulate the delay of a return signal from an object located a particular distance from the collision avoidance radar system, and to upconvert and transmit the intermediate frequency signal back to the collision avoidance radar system to determine if the collision avoidance radar system provides accurate distance readings. The radar test system further couples the intermediate frequency signal to a spectrum analyzer. The spectrum analyzer can be used to determine if the collision avoidance radar system is operating within the 76–77 GHz frequency band allocated by the Federal Communications Commission (FCC). The radar test system further couples the intermediate frequency signal to a power meter. The power meter can be utilized to determine the power of the signal transmitted from the collision avoidance radar system.

14 Claims, 2 Drawing Sheets

RADAR TEST SYSTEM FOR COLLISION AVOIDANCE AUTOMOTIVE RADAR

CROSS-REFERENCE TO RELATED APPLICATION

This application claims the benefit of U.S. Provisional Application No. (60/054,759), filed Aug. 5, 1997.

BACKGROUND OF THE INVENTION

1. Field of the Invention

The present invention relates to a device for testing the performance accuracy of an automotive collision avoidance radar system providing frequency modulation (FM) continuous wave (CW) radar signals.

2. Description of the Related Art

Recently, manufacturers such as Bosch of Germany have begun manufacturing collision avoidance radar systems for automobiles. A collision avoidance radar operating in a FM/CW mode transmits a signal from an antenna typically located in the grill area of an automobile. The collision avoidance radar then determines from the frequency shift of a return signal received by the antenna a distance an object causing the return signal is located from the automobile. Systems in the United States are configured to operate within a 76–77 GHz frequency band allocated by the Federal Communications Commission (FCC) for collision avoidance radar systems.

To assure proper performance of a collision avoidance radar system, the device must be regularly tested. Testing is performed to assure the collision avoidance radar system is operating within the 76–77 GHz range specified by the FCC. Testing is also performed to assure that the system is radiating adequate power. Such testing is typically performed by connecting a test receiver to an oscillator of a collision avoidance radar system. A disadvantage of testing a point prior to the antenna, however, is that any errors due to the antenna will not be detected.

Test measurements are further made to assure that the collision avoidance radar system is making proper calculations of distance to an object creating a return signal. Such testing is typically performed by placing a $1^2$ meter metal spherical standard at desired distances from the collision avoidance radar system, and checking that the radar system accurately indicates the distances. However, a disadvantage of utilizing the $1^2$ meter standard for a simulator is the large area required for simulation as well as awkwardness of moving the $1^2$ meter standard relative to the collision avoidance system.

SUMMARY OF THE INVENTION

The present invention enables testing to assure a collision avoidance radar system is operating within the 76–77 GHz range specified by the FCC by measuring a signal provided from the antenna of the collision avoidance radar system.

The present invention further enables testing without utilizing a passive standard, such as a $1^2$ meter standard, to determine if the collision avoidance radar system is accurately determining a distance to an object.

The present invention is a radar test system for testing a collision avoidance radar system. The radar test system includes an antenna for receiving a signal from the collision avoidance radar system, and circuitry for downconverting the signal from the collision voidance radar to an intermediate frequency signal, for delaying the intermediate frequency signal to simulate the delay of a return signal from an object located a particular distance from the collision avoidance radar system, and for upconverting and transmitting the intermediate frequency signal back to the collision avoidance radar system. Readings can then be taken from the collision avoidance radar system to determine if it accurately calculates distance to an object.

The radar test system further couples the intermediate frequency signal to a spectrum analyzer. Measurements can then be made using the spectrum analyzer to determine where within an allocated frequency bandwidth, such the 76–77 GHz band allocated by the FCC, the collision avoidance radar signal is operating. The spectrum analyzer also enables determining if the collision avoidance radar signal is operating outside the allocated frequency band.

The radar test system further couples the intermediate frequency signal to a power meter. The power meter can be utilized to determine the power of the signal transmitted from the collision avoidance radar system. The collision avoidance radar system can further be placed on an azimuth positioner enabling the power meter to be utilized to measure antenna patterns to assure proper power is provided from the antenna of the collision avoidance radar system in all desired directions.

BRIEF DESCRIPTION OF THE DRAWINGS

Further details of the present invention are explained with the help of the attached drawings in which.

DETAILED DESCRIPTION

Figure 1:
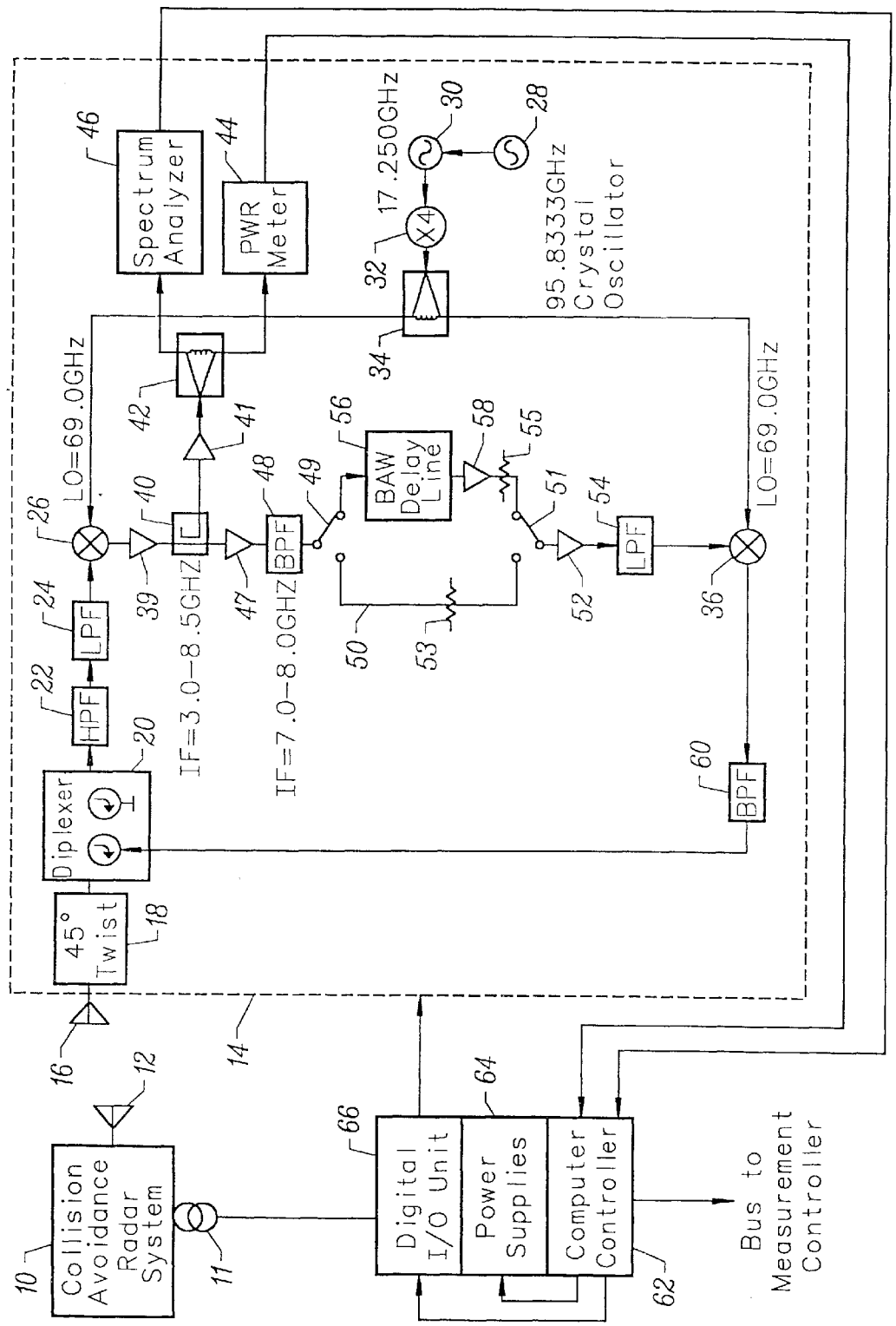
FIG. 1 shows components of a radar test system of the present invention included in a setup for testing a collision avoidance radar system.

FIG. 1 shows components of the radar test system 14 of the present invention included in an overall test setup to determine properties of a collision avoidance radar system. The collision avoidance radar system 10 is shown mounted on a precision azimuth rotating antenna positioner 11 whose angular position can be accurately controlled and monitored for antenna pattern measurements. The collision avoidance radar system 10 transmits a signal from its antenna 12 which should be in the 76–77 GHz bandwidth to an antenna 16 of the radar test system 14 of the present invention. The antenna 16 is preferably a standard gain pyramidal horn having 24 dB of nominal gain and oriented for a desired polarization. Absorbing material is preferably provided around the antenna 16 to minimize reflections from the edges of antenna 16 and housing of the radar test system 14.

The antenna 16 is connected via one or more 45 degree twist waveguide tubes 18 to isolators forming a duplexer 20. The isolators provide the received signal through a high pass filter (HPF) 22 and a low pass filter (LPF) 24 to one input of a mixer or converter 26. The combination high pass-low pass filter (22, 24) have frequency ranges selected to limit the received frequencies to 72.0–77.5 GHz which are received by the mixer 26.

I. Downconversion

The radar test system 14 further includes a phase locked loop (PLL) 30 which is driven by a reference crystal oscillator 28 preferably operating at 95.8333 MHz so that the PLL 30 outputs a signal at 17.250 GHz. The 17.250 GHz signal from the output of PLL 30 is provided through a X4 multiplier 32 to provide a local oscillator (LO) signal of 69.0

GHz to a power divider 34. The power divider 34 serves to provide a portion of the LO signal to a second input of mixer 26.

Mixer 26, thus, downconverts the 72.0–77.5 FM RF carrier by mixing it with the 69.0 GHz LO signal to provide a 3.0–8.5 GHz intermediate frequency (IF) signal at its output. The LO frequency is chosen to operate on the low side of the RF signal range to simplify LO circuitry. Any modulated signal in the 72.0–77.5 frequency band will be down converted to the IF band. The IF output signal from mixer 26 is then provided through a low noise amplifier 39 and directional coupler 40. The directional coupler 40 serves to couple the IF signal through another low noise amplifier 41 to a power divider 42.

II. IF Signal Characterization

The power divider 42 provides a portion of the power received to a diode sensor of a power meter 44 which is characterized to read the root mean square (RMS) power of the linear FM modulated signal. The power meter 44 is used for the measurement of the collision avoidance radar system transmitted power and can also be used as a power sensor when antenna radiation pattern measurements are made if so desired.

A second portion of the signal from the power divider 42 is provided to a spectrum analyzer 46. The spectrum analyzer enables determination of the frequency band occupied by the modulated radar signal within the desired 76–77 GHz frequency range, and also enables assurance that the received signal is operating in the 76–77 GHz frequency range by measuring spurious portions of the received signal operating slightly outside the 76–77 GHz range.

Figure 2:
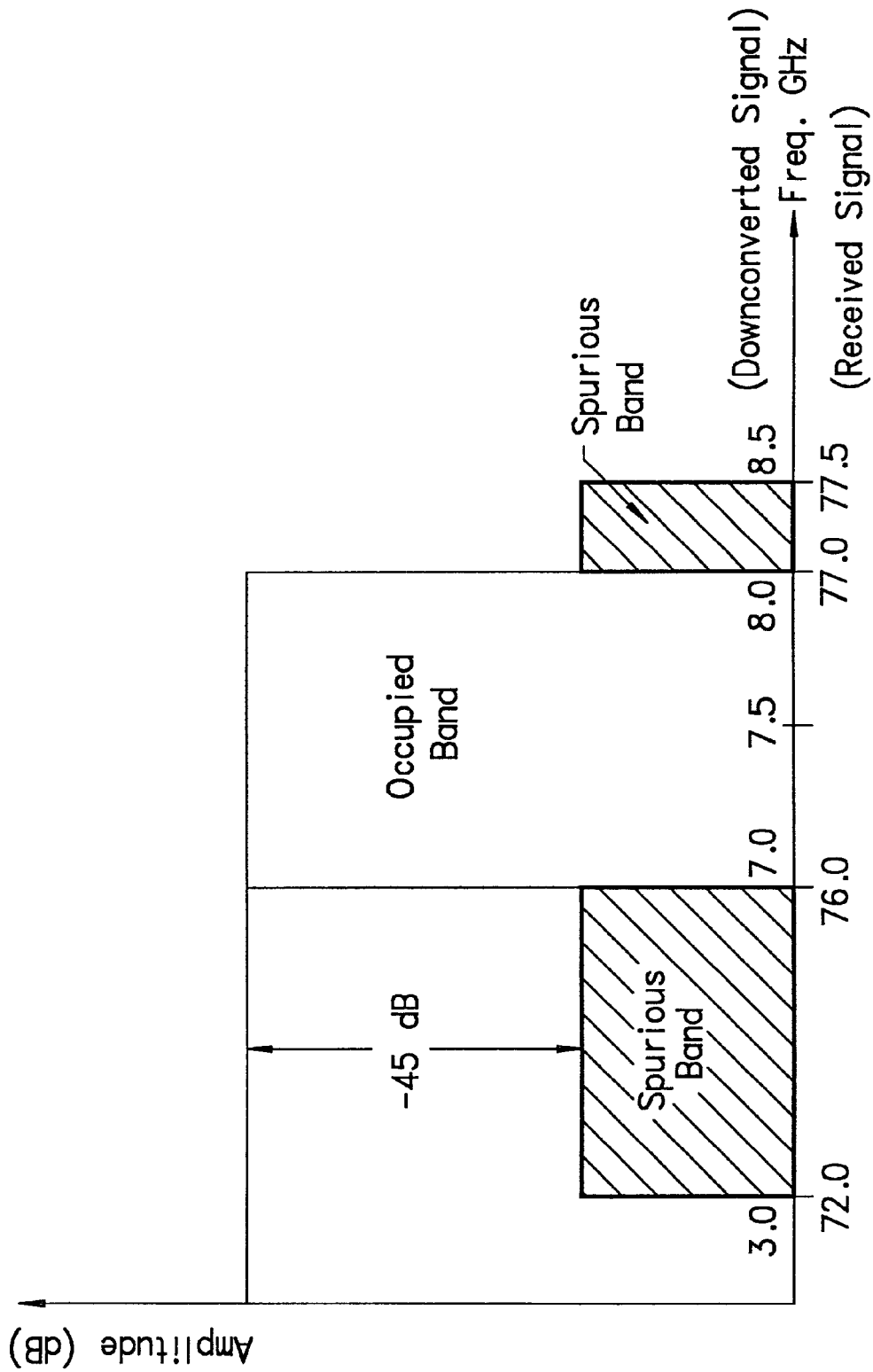
FIG. 2 illustrates a 72.0–77.5 GHz signal received by the radar test system vs. amplitude.

FIG. 2 illustrates a 72.0–77.5 GHz signal received by the radar test system 14 vs. amplitude. As shown, when downconverted, the 72.0 GHz RF signal corresponds to a 3.0 GHz IF signal, while the 77.5 GHz RF signal corresponds to the 8.5 GHz IF signal. The desired modulated signal will be in the range of 76.0–77.0 GHz for the RF signal which corresponds to the 7.0–8.0 GHz for the IF signal. The collision avoidance radar desired signal center frequency of 76.5 GHz will then translate to the 7.5 GHz IF frequency. The spectral density of the desired IF signals in the 7.0–8.0 GHz range received at the sense amplifier 46 will be on the order of −50 dBm per MHz residual bandwidth for a 0 dBm transmitted power. The spurious signals detected by the millimeter (mm) wave radar test system at the spectrum analyzer amplifier 46 in the 3.0–7.0 GHz IF test range and the 8.0–8.5 GHz IF test range can have a spectral density greater than −70 dBm/MHz. For purposes of illustration in FIG. 2, the spurious band signals are shown to be at least −45 dB down.

The method enabling accurate determination to a 95.83333 MHz reference frequency of the existence of such spurious signals is to use a spectrum analyzer 46 as the detector. Spectrum analyzers typically have maximum resolution bandwidths on the order of 3 MHz and can be tuned at 50 MHz per millisecond rate over a 4 GHz bandwidth. To measure the spurious signals, the spectrum analyzer 46 is tuned over the frequency range of 3.0–7.0 GHz and 8.0–9.5 GHz.

III. Signal Delay Simulation

After power and occupied signal band measurements are made from a signal from coupler 40, the signal from coupler 40 is again passed through a low noise amplifier 47 and provided to a band pass filter (BPF) 48 to limit the signal provided to the 7.0–8.0 GHz IF signal, which corresponds to the 76–77 GHz signal from the collision avoidance radar system. The band pass filter 48 functions to remove any intermodulation products as well as undesired spurious signals. The output of the bandpass filter 48 is provided to single pole double through switches 49 and 51 allowing conditioning of the signal using a choice of a 7 meter delay path, or a 120 meter delay path. Note that the radar test system antenna 16 is preferably separated from the collision avoidance radar system antenna 12 by 5 meters to satisfy the Fraunhofer conditions.

To simulate the delay and amplitude of a radar target with the specified radar cross section (RCS) of $1^2$ meter at a range of 7 meters a first path 50 is connected between the switches 49 and 51. The delay corresponding to 7 meters is achieved by using a zero length through line as the element 50. The amplitude of the signal from the through line is then amplified 5 dB by amplifier 52 to achieve the required loop gain to simulate the radar return for a $1^2$ meter standard.

To simulate the delay and amplitude of a radar target with a specified RCS of $1^2$ meter at a range of 120 meters, a bulk acoustic wave (BAW) delay line 56, and additional amplifier 58 are connected between the switches 49 and 51. For the present invention, a desired BAW delay line operating in the range from 7.0 to 8.0 GHz is preferably used. With such a BAW delay line, the bandwidth of the delay will typically be at least 1 GHz at the 1 dB points of the BAW delay line.

The losses associated with the BAW delay line 56 are significantly higher than the through line 50, and an additional amplifier 58 in combination with amplifier 52 is used to compensate for the loss of the BAW delay line 56. The combination of the amplifiers 58 and 52 further are adjusted to simulate the amplitude associated with a $1^2$ meter standard placed at 120 meters. Note that the insertion loss for a coaxial delay line that simulates a 120 meter target would be greater than 300 dB, making use of the BAW delay line which has an insertion loss of less than 50 dB for a 120 meter target more practical. The attenuators 53 and 55, along with LPF 54 operate to remove spurious signals, and the LPF 54 serves to provide a first input of mixer or converter 36 for upconversion.

IV. Upconversion

A portion of the 69.0 GHz LO signal from multiplier 32 is provided by power divider 34 to a second input of mixer 36 enabling upconversion of the conditioned signal in the range of 7.0–8.0 GHz to a signal in the 76–77 GHZ range. The band pass filter 60 prevents intermodulation products and other spurious signals outside the 76–77 GHz frequency range from being provided in a retransmitted signal. The upconverted signal from band pass filter 60 is then provided through an isolator in duplexer 20 to antenna 16 for retransmission to the collision avoidance radar system 10.

Measurement signals from the spectrum analyzer 46 and power meter 44 are provided to a computer controller 62, which are then provided via a bus to a larger measurement controller system. The computer controller 62 also provides signals to control power supplies 64 for the components in the test setup of FIG. 1, and further provides signals to a digital I/O unit 66. The Digital I/O unit 66 serves to control components of the radar test system 14, to control the azimuth positioner 11, and to control the collision avoidance radar system 10.

By appropriately operating the computer controller 52, the radiation pattern of the radar sensor antenna 12 can be characterized by measuring the power level of the either the signal from the power meter 44, or from the power level of a signal received by the collision avoidance radar system 10 as reradiated from the radar test system 16 as the radar 10 is rotated on the antenna positioner 11.

Although the present invention has been described above with particularity, this was merely to teach one of ordinary skill in the art how to make and use the invention. Many other modifications will fall within the scope of the invention, as that scope is defined by the claims provided below. For example, if the frequency range of 76–77 GHz allocated by the FCC were altered, the LO frequency and frequency ranges of filters in the radar test system 14 could be changed to accommodate such different frequencies. Further, different frequency BAW delay lines, or different length coaxial lines could be utilized in place of elements 50 and 56 to simulate targets placed at different distances from the collision avoidance radar system 10.

What is claimed is:

1. A method for testing a collision avoidance radar system comprising:

receiving a signal from the collision avoidance radar system;

downconverting frequency of the signal from the collision avoidance radar system to provide an intermediate frequency signal;

delaying the intermediate frequency signal;

upconverting frequency of the intermediate frequency signal to provide a conditioned signal; and transmitting the conditioned signal to the collision avoidance radar system wherein frequency changes in the conditioned signal relative to the signal received from the collision avoidance radar system are substantially due to a physical delay created in the step of delaying the intermediate frequency signal.

2. The method of claim 1, wherein the step of delaying the intermediate frequency signal is provided utilizing a time delay device.

3. The method of claim 2, wherein the time delay device is a Bulk Acoustic Wave Delay Device.

4. The method of claim 1 further comprising the steps of:

providing the intermediate frequency signal to a spectrum analyzer; and measuring the frequency of the intermediate signal using the spectrum analyzer to determine if the signal provided from the collision avoidance radar system is within a desired frequency range.

5. The method of claim 1 further comprising the steps of:

providing the intermediate frequency signal to a power meter; and measuring power of the intermediate signal using the power meter to determine power of the signal provided from the collision avoidance radar system.

6. The method of claim 1 further comprising the step of:

amplifying the intermediate frequency signal so that in combination with the step of delaying the intermediate frequency signal, the conditioned signal will simulate gain and delay for a radar return from a predetermined sized object located a predetermined distance from the collision avoidance radar system.

7. A method for testing a collision avoidance radar system comprising:

receiving a signal from the collision avoidance radar system;

downconverting frequency of the signal from the collision avoidance radar system to provide an intermediate frequency signal;

providing the intermediate frequency signal to a power meter;

measuring power of the intermediate signal using the power meter to determine to power of the signal provided from the collision avoidance radar system;

rotating a position of an azimuth positioner supporting the collision avoidance radar system while performing the step of measuring power of the intermediate signal to provide an antenna pattern measurement;

delaying the intermediate frequency signal;

upconverting frequency of the intermediate frequency signal to provide a conditioned signal; and transmitting the conditioned signal to the collision avoidance radar system.

8. A method for testing a collision avoidance radar system comprising:

receiving a signal from the collision avoidance radar system;

downconverting frequency of the signal from the collision avoidance radar system to provide an intermediate frequency signal;

delaying the intermediate frequency signal;

upconverting frequency of the intermediate frequency signal to provide a conditioned signal; and transmitting the conditioned signal to the collision avoidance radar system;

rotating a position of an azimuth positioner supporting the collision avoidance radar system; and measuring power of the conditioned signal while performing the step of rotating the position of the azimuth positioner to provide an antenna pattern measurement.

9. A radar test system for testing a collision avoidance radar, the radar test system comprising:

a downconverter having a first input coupled to provide a received signal from the collision avoidance radar, a second input and an output;

an upconverter having an output coupled to provide a transmitted signal to the collision avoidance radar, a first input and a second input;

a local oscillator for providing a signal to the second input of the downconverter and the upconverter; and switches for selectively coupling one of at least two delay elements from the output of the downconverter to the first input of the upconverter, wherein frequency changes in the transmitted signal relative to the received signal are substantially due to a physical delay created by one of the delay elements.

10. The radar test system of claim 9, wherein one of the delay elements comprises a Bulk Acoustic Wave delay line.

11. The radar test system of claim 10, wherein one of the delay elements comprises a through line.

12. The spectrum analyzer of claim 9 further comprising:

a coupler having a through path coupling the output of the downconverter to the switches, and a coupling path terminal;

a power divider having an input coupled to the coupling path terminal of the coupler, a first output and a second output;

a spectrum analyzer coupled to the first output of the power divider; and a power meter coupled to the second output of the power divider.

13. The spectrum analyzer of claim 9 further comprising an amplifier coupling the switches to the first input of the upconverter.

14. A radar test system for testing a collision avoidance radar, the radar test system comprising:

a duplexer having a first terminal, a second terminal and a third terminal;

an antenna for receiving a signal from the collision avoidance radar system;

a 45 degree twist coupling the antenna to a first terminal of the duplexer;

a downconverter having a first input, a second input and an output;

an upconverter having an output, a first input and a second input;

a local oscillator for providing a signal to the second input of the downconverter and the upconverter;

switches for selectively coupling one of a bulk acoustic wave delay line, and a through line from the output of the downconverter to the first input of the upconverter;

a series connected high pass filter and low pass filter coupling a second terminal of the duplexer to the first input of the downconverter;

a coupler having a through path with a first terminal coupled to the output of the downconverter and a second terminal, and a coupling path terminal;

a power divider having an input coupled to the coupling path terminal of the coupler, a first output and a second output;

a spectrum analyzer coupled to the first output of the power divider;

a power meter coupled to the second output of the power divider;

a band pass filter having an input coupled to the second terminal of the through path of the coupler and an output coupled to the switches;

a series connected amplifier and filter coupling the switches to the first input of the upconverter; and a band pass filter coupling the output of the upconverter to the third terminal of the duplexer.

\* \* \* \* \*